US011604895B2

(12) United States Patent
Borsato et al.

(10) Patent No.: US 11,604,895 B2
(45) Date of Patent: Mar. 14, 2023

(54) PERMISSION MONITORING AND DATA EXCHANGE

(71) Applicant: Consent Vault Inc., Draper, UT (US)

(72) Inventors: Emerson Paulo Borsato, Draper, UT (US); Walter Timothy Miller, Henderson, NV (US); Joni Hansen Pierce, Alpine, UT (US)

(73) Assignee: Consent Vault Inc., Draper, UT (US)

( * ) Notice: Subject to any disclaimer, the term of this patent is extended or adjusted under 35 U.S.C. 154(b) by 0 days.

(21) Appl. No.: 17/662,014

(22) Filed: May 4, 2022

(65) Prior Publication Data
US 2022/0358239 A1 Nov. 10, 2022

Related U.S. Application Data

(60) Provisional application No. 63/184,042, filed on May 4, 2021.

(51) Int. Cl.
*G06F 21/00* (2013.01)
*G06F 21/62* (2013.01)
*G06F 21/60* (2013.01)
*G06F 21/40* (2013.01)

(52) U.S. Cl.
CPC .......... *G06F 21/6245* (2013.01); *G06F 21/40* (2013.01); *G06F 21/604* (2013.01); *G06F 2221/2115* (2013.01)

(58) Field of Classification Search
CPC .... G06F 21/6245; G06F 21/40; G06F 21/604; G06F 2221/2115
See application file for complete search history.

(56) References Cited

U.S. PATENT DOCUMENTS

| 6,820,204 B1 | 11/2004 | Desai et al. |
| 2012/0047575 A1 | 2/2012 | Baikalov et al. |
| 2016/0098577 A1* | 4/2016 | Lacey ................ G06Q 30/0251 726/28 |
| 2017/0093826 A1* | 3/2017 | Werneyer ............ H04L 63/0281 |
| 2017/0093917 A1* | 3/2017 | Chandra ................. H04L 63/20 |
| 2019/0098019 A1 | 3/2019 | Coleman et al. |
| 2019/0258820 A1* | 8/2019 | Gaspar .................. G06F 21/629 |

(Continued)

FOREIGN PATENT DOCUMENTS

WO 2013/003302 A1 1/2013

OTHER PUBLICATIONS

International Search Report and Written Opinion, as issued in connection with International Patent Application No. PCT/US2022/072108, dated Jul. 25, 2022, 8 pgs.

*Primary Examiner* — Ghazal B Shehni
(74) *Attorney, Agent, or Firm* — Maschoff Brennan

(57) ABSTRACT

A method may include providing a user with one or more questions regarding permissions for use of personal data related to the user, and compiling the permissions for the use of the personal data. The method may also include receiving a request from a third party for access to the personal data, and providing a response to the third party based on the compiled permissions. The method may also include, based on the response indicating that the third party is permitted access to the personal data, sending a responsive dataset to a data holder, where the responsive dataset is responsive to the request from the third party. The method may also include facilitating the third party accessing the personal data.

20 Claims, 10 Drawing Sheets

(56) References Cited

U.S. PATENT DOCUMENTS

2020/0050796 A1   2/2020  Lacey et al.
2021/0125297 A1*  4/2021  Doran .................... G06F 40/289
2022/0198054 A1*  6/2022  Picos ...................... G06F 21/31

* cited by examiner

PERMISSION MONITORING AND DATA EXCHANGE

CROSS-REFERENCE TO RELATED APPLICATIONS

This application claims the benefit of U.S. patent application Ser. No. 63/184,042, filed on May 4, 2021; the disclosure of which is incorporated herein by reference in its entirety.

FIELD

One or more of the embodiments discussed in the present disclosure are related to permission tracking and/or an associated data exchange.

BACKGROUND

Permission or consent associated with data access has become an increasingly difficult issue with increases in complexity due to data privacy laws and regulations. For example, California has legislation in place which places certain requirements and obligations on businesses that use or store personal data.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that includes providing a user with one or more questions regarding permissions for use of personal data related to the user, and compiling the permissions for the use of the personal data. The method may also include receiving a request from a third party for access to the personal data, and providing a response to the third party based on the compiled permissions. The method may also include, based on the response indicating that the third party is permitted access to the personal data, sending a responsive dataset to a data holder, where the responsive dataset is responsive to the request from the third party. The method may also include facilitating the third party accessing the personal data.

Embodiments of the present disclosure may additionally include systems and/or devices that facilitate performance of example methods of the present disclosure.

One or more example methods, systems, and/or devices of the present disclosure may include where the permissions include a type of personal data, a purpose for access to the personal data, what entities are permitted access to the personal data, and a condition related to having access to the personal data.

One or more example methods, systems, and/or devices of the present disclosure may include where the condition includes at least one of a threshold amount of compensation, a living or dead state of the user, or a temporal condition.

One or more example methods, systems, and/or devices of the present disclosure may include additional operations, such as based on the response indicating that the third party is permitted access to the personal data, sending a responsive dataset to a data holder, where the responsive dataset may be responsive to the request from the third party; and facilitating the third party accessing the personal data.

One or more example methods, systems, and/or devices of the present disclosure may include where facilitating the third party accessing the personal data may include one or more additional operations, such as receiving an encrypted version of the personal data; and passing the encrypted version of the personal data to the third party.

One or more example methods, systems, and/or devices of the present disclosure may include where the encrypted version of the personal data may be received without ability or information to decrypt the personal data.

One or more example methods, systems, and/or devices of the present disclosure may include where passing the encrypted version of the personal data may include an operation such as acting as a passthrough between the data holder and the third party such that the personal data is not locally stored.

One or more example methods, systems, and/or devices of the present disclosure may include where passing the encrypted version of the personal data may include an operation such as posting the encrypted data to a secure shell file transfer protocol (SFTP) server; and providing an identifier of the encrypted data on the SFTP to the third party.

One or more example methods, systems, and/or devices of the present disclosure may include where facilitating the third party accessing the personal data may include one or more additional operations, such as receiving a location identifier of where the personal data is accessible; and providing the location identifier to the third party.

One or more example methods, systems, and/or devices of the present disclosure may include where facilitating the third party accessing the personal data may include one or more additional operations, such as providing an identifier of the third party in the request such that the data holder is able to provide the personal data directly to the third party.

One or more example methods, systems, and/or devices of the present disclosure may include additional operations, such as sending notification to the user that their data has been accessed by the third party.

One or more example methods, systems, and/or devices of the present disclosure may include additional operations, such as receiving compensation from the third party for access to the data and providing at least a portion of the compensation to the user, the data holder, or both.

One or more example methods, systems, and/or devices of the present disclosure may include where the request may be for a set of users including at least two characteristics including at least one of (i) gender, (ii) age, (iii) disease condition, and (iv) who are willing to permit access to their respective personal data for a target purpose.

One or more example methods, systems, and/or devices of the present disclosure may include additional operations, such as receiving an update from the user regarding the permissions after compiling the permissions; and based on the update, overriding the compiled permissions.

One or more example methods, systems, and/or devices of the present disclosure may include additional operations, such as, based on the overridden compiled permissions, sending a communication to a third party previously granted access to the personal data that the previously granted access is revoked.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
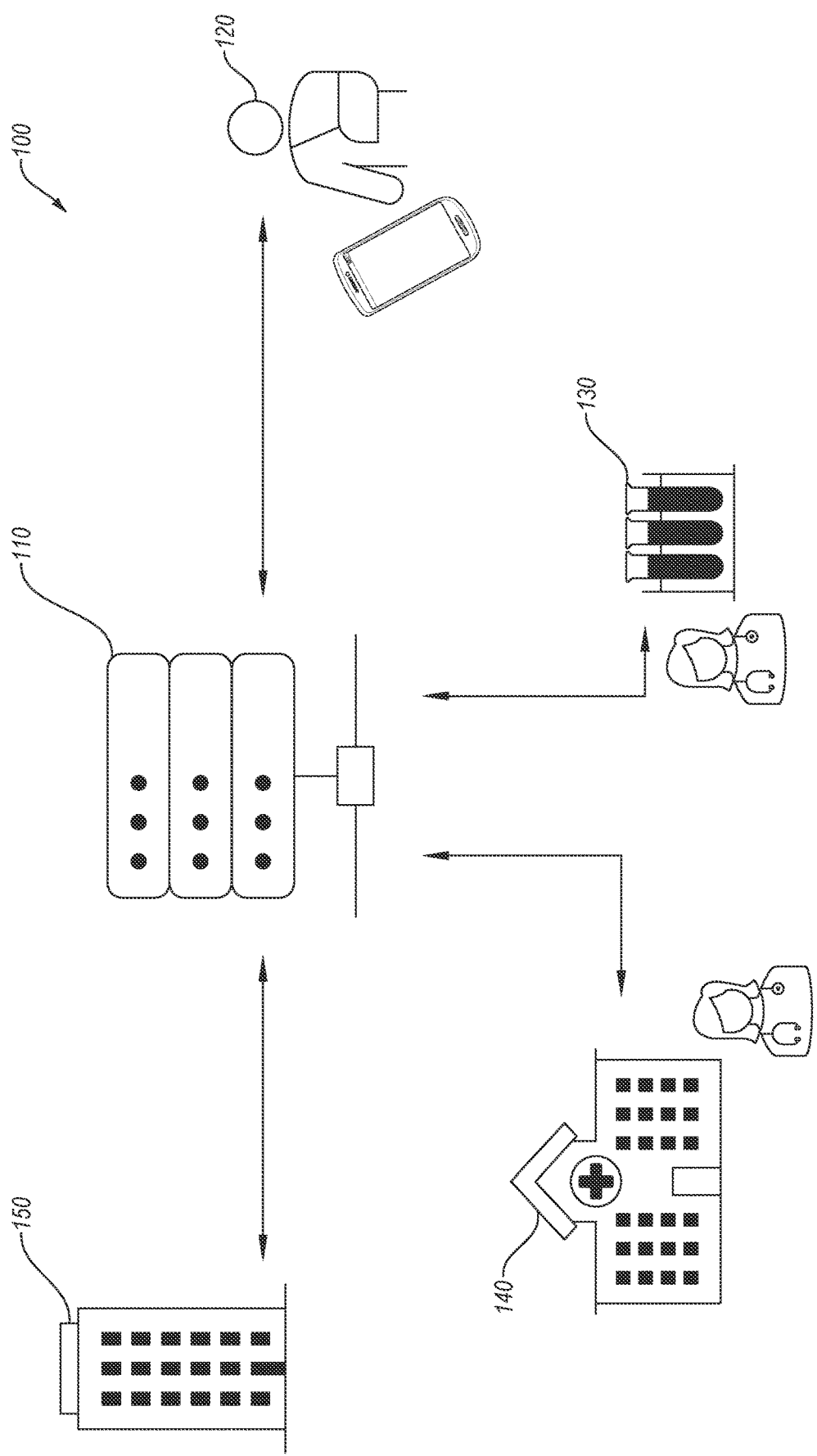
FIG. 1 is a diagram representing an example system to facilitate permission monitoring and data exchange.

Some embodiments described in the present disclosure relate to monitoring of permission related to data access and use, and/or the use of such permissions in relation to access of data.

In some embodiments, a consent server may operate to interact with one or more users, such as patients, to gather information regarding use of data of the user. For example, a user may be asked questions regarding what data (e.g., demographic, medications, disease history, among others) is permitted to be shared with what entities (e.g., a given clinic or laboratory, their related entities, data brokers, health insurance providers, drug research companies, among others) for what purposes (e.g., to provide healthcare services, for medical research, research solicitation, product offerings, for any purpose, among others). As the user provides answers, a matrix of their responses may be generated and/or maintained by which the consent server may determine what data of the user may is accessible, in what circumstances, and by whom.

In some embodiments, the consent server may act as a facilitator in data exchange between a third party requesting access to data and a data holder (which may be referred to as a data custodian, data caretaker, data warehouse, or other similar terminology) that is in possession of the personal data of the user. In these and other embodiments, the consent server may not store or maintain the data of the user, aside from a high level amount of demographic information to identify the user and their permissions. For example, a drug research company may send a request to the consent server asking for a certain cohort of individuals, such as males over 45 with a certain disease who are willing to have their data used for drug research. The consent server may identify a responsive set of individuals who meet the cohort requirement and the consent requirements, and may send the responsive data set to a data holder that is in possession of the personal data of the individuals in the responsive set. Additionally or alternatively, the consent server may send an indication of which data of the personal data to which the third party has access.

In these and other embodiments, the data holder may encrypt the data and provide it to the consent server, who may then provide the third party with the encrypted data.

In some embodiments, one or more aspects of the present disclosure may improve the operation of a computer or other related fields. For example, the consent server of the present disclosure may facilitate a more secure process for users to indicate their consent for various aspects of access to their personal data. As another example, the consent server may operate to provide more direct communications between those seeking certain types of data and those who hold the data, thereby reducing the extra network congestion that occurs when the data is communicated through multiple steps and to multiple parties. For example, when a third party seeks data, in conventional approaches a user may manually submit a series of queries to a data warehouse to try and find the data sought by the third party, receive data responsive to the query, analyze the data to check to see if it includes what is desired, and then provide the data to the third party, which may utilize numerous network resources and computing resources in the repeated transmission and processing of the data. As another example of manners in which one or more embodiments of the present disclosure may improve a computer, a specific and concise data set may be requested and computing resources and network resources may be conserved as a consent server may be aware of which data is both responsive to the request and which consent is granted to access the data such that the more concise and specific data is all that is processed and communicated, rather than a large data set in bulk. As another example, a user may have an improved user experience by being able to observe and/or track requests and/or access to their personal data. As a further example, privacy and security of computing systems may be improved as private data of patients and/or other users may be accessible by fewer entities as a consent server may facilitate access to a user's data without ever having access to unencrypted forms of the data. As an additional example, one or more embodiments of the present disclosure may improve drug or medical research and/or patient care, for example, the consent server may act as a go-between and/or may facilitate drug or medical research companies finding individuals who fit a demographic and are willing to participate in research and may improve patient care by providing connection between patients seeking non-traditional, new, and/or experimental care or medications with organizations that provide that sort of care.

Embodiments of the present disclosure are explained with reference to the accompanying drawings.

FIG. 1 is a diagram representing an example system 100 to facilitate permission monitoring and data exchange, in accordance with one or more embodiments of the present disclosure. The system 100 may include a consent server 110, a user 120 (such as a patient), one or more data holders, such as a laboratory 130 and/or a hospital 140. The system 100 may also include a third party 150 that may seek access to data of the user 120.

In operation, the consent server 110 may operate to interact with the user 120 (such as via an electronic device like a cell phone, tablet, laptop, desktop, smartwatch, among others) to obtain information from the user 120 regarding their consent to various aspects of their data. For example, the user 120 may interact with a user interface (such as those illustrated in FIGS. 3A and 3B) to provide answers to questions regarding use of, access to, restrictions to, or other such constraints relative to the personal information of the user 120. In some embodiments, the user 120 may additionally or alternatively be provided with a user interface via which the user 120 may indicate their consent or acknowledge reception of certain notices, such as Health Insurance Portability and Accountability Act (HIPAA) forms, notices, permissions, waivers, or other forms, such as forms or other requirements from the laboratory 130 and/or the hospital 140. For example, the user 120 may be presented with a portable document format (PDF) consent form that the user may electronically sign on the user interface. In these and other embodiments, a given entity (such as the laboratory 130 and/or the hospital 140) may use their own consent form or may utilize a consent form supplied by the consent server 110. In these and other embodiments, the various signed consent forms may be stored and maintained by the consent server 110. For example, the user 120 may log in to a user account with the consent server 110 and observe some or all of their signed consent forms and/or the consents/permissions they have granted. In some embodiments, the user interface may include fillable form documents that may be populated with the relevant information of the user 120 for the user to electronically sign.

Continuing description of operation of the system 100, the content server 110 may utilize store the responses of the user 120. For example, the content server 110 may generate a matrix, database, a spreadsheet, or other storage modality in which the permission preferences and/or consent granted by the user 120 relative to access to their personal data is maintained by the consent server 110. For example, a separate entry may be included for each purpose (such as for drug development, product offers, research solicitation, among others), and may include a table with one or more given entities (such as Clinic A), partners of the entities (such as laboratories, vendors, service providers, referring office to/from Clinic A, among others), and/or anyone, and which elements of data (e.g., demographics, medications, allergies, genetic data, among others) may or may not be shared with the different groups. An example set of entries is included below as Table 1 (associated with Drug Development), Table 2 (associated with Research Solicitation), and Table 3 (associated with Product Offers):

TABLE 1

| Drug Development | | | |
|---|---|---|---|
| Data/Shared With | Clinic A | Clinic A Partners | Everyone |
| Demographics | X | X | |
| Medications | X | X | |
| Allergies | | | |
| Genetic Data | | | |

TABLE 2

| Research Solicitation | | | |
|---|---|---|---|
| Data/Shared With | Clinic A | Clinic A Partners | Everyone |
| Demographics | X | X | |
| Medications | X | X | |
| Allergies | | | |
| Genetic Data | | | |

TABLE 3

| Product Offers | | | |
|---|---|---|---|
| Data/Shared With | Clinic A | Clinic A Partners | Everyone |
| Demographics | X | | |
| Medications | X | | |
| Allergies | X | | |
| Genetic Data | X | | |

While Tables 1, 2, and 3 include various fields, it will be appreciated that these fields are simple examples and any number of entities (such as additional clinics, laboratories, hospitals, health clubs, among others), data types, and/or purposes are contemplated in the present disclosure.

Continuing description of operation of the system 100, the consent server 110 may act as a middle party between entities seeking data about the user 120 and data holders. For example, the laboratory 130 may seek access to the personal information of the user 120 in conjunction with treatment as requested by the hospital 140. The laboratory 130 may contact the consent server 110 to determine whether or not the user 120 has granted access to their personal data to the laboratory 130. Based on the laboratory 130 having access based on the information stored by the consent server 110, the consent server 110 may facilitate the laboratory 130 having access to the personal data of the user 120 held by the hospital 140.

As another example, the third party 150 may interact with the consent server 110 to inquire regarding personal data of a cohort of test subjects. For example, the third party 150 may include a drug research company looking for participants in a study of a developmental drug. The third party 150 may indicate the type of data for which they are looking (e.g., males, over 50, willing to share their data for drug research), and the consent server 110 may communicate a responsive data set to the data holder (such as the hospital 140) of users who meet the requested criteria and whose consents and/or permissions coincide with the requested access. The consent server 110 may facilitate the third party 150 obtaining access to such personal data from the data holder (such as the hospital 140).

In some embodiments, if the user 120 updates their preferences, data access permissions, or other consents they have granted, any affected entities may have their access revoked and/or may be notified of the change. For example, if the third party 150 previously had access to the personal data of the user 120 and the user 120 changed their consent such that the third party 150 no longer was within the consents granted by the user 120, the consent server 110 may notify the third party 150 of the change in consent and/or that the third party no longer legally has access to the personal data of the user 120.

In some embodiments, the consent server 110 may facilitate a financial aspect of the exchange of data. For example, the third party 150 may include an offer of compensation for access to the personal data of the user 120, and the consent server 110 may receive the compensation and distribute the compensation between one or more of the user 120, the data holder (e.g., the laboratory 130 and/or the hospital 140), and/or the consent server 110.

The consent server 110 may include any system, computing device, or combination thereof that is configured to facilitate interaction with the various entities of the system 100 as described herein. In some embodiments, the consent server 110 may be configured to store the various consents granted by the user 120 in conjunction with a reduced amount of demographic data by which the user 120 may be identified, such as the age, gender, name, address, and phone number of the user 120. The consent server 110 may additionally store a user name and/or password for the user 20 by which the user 120 is able to log in to review their associated consents granted and/or signed forms. In some embodiments, the consent server 110 may be configured specifically not to store personal data of the user 120 aside from the demographic information or a limited version of the demographic information. In other embodiments, the consent server 110 may store personal data of the user 120.

The user 120 may include any individual or person. The user 120 may include a patient at the hospital 140 or who has had work performed at the laboratory 130. The user 120 may interact with the consent server 110 via an electronic device of the user 120, such as a mobile device, a tablet, a laptop or desktop computer, a smart device (like a smart watch) or other computing device.

The laboratory 130 and/or the hospital 140 may include any entity that provides health care or other related services. For example, the laboratory 130 and/or the hospital 140 may provide health care services to the user 120 and may store associated personal data of the user 120 based on the services provided. In some embodiments, the laboratory 130 and/or the hospital 140 or any other data holder may also operate in a similar or comparable manner to the third party 150 in seeking access to data held by another data holder.

The third party 150 may include any entity that seeks access to the personal data of the user 120. For example, the third party 150 may include a drug research company, a health insurance company, a health insurance broker, a medical device providing company, a marketing company, a social media company, or any other entity seeking access to the personal data of the user 120 and/or other users. In some embodiments, the third party 150 may include one or both of the laboratory 130 and/or the hospital 140.

In some embodiments, any of the components of the system 100 may be configured to communicate in and/or utilize any data format or modality or protocol. For example, the system 100 may utilize Fast Healthcare Interoperability Resources (FHIR) as designed by the Health Level Seven (HL7) International health-care standards organization.

Modifications, additions, or omissions may be made to FIG. 1 without departing from the scope of the present disclosure. For example, the system 100 may include more or fewer elements than those illustrated and described in the present disclosure.

Figure 2:
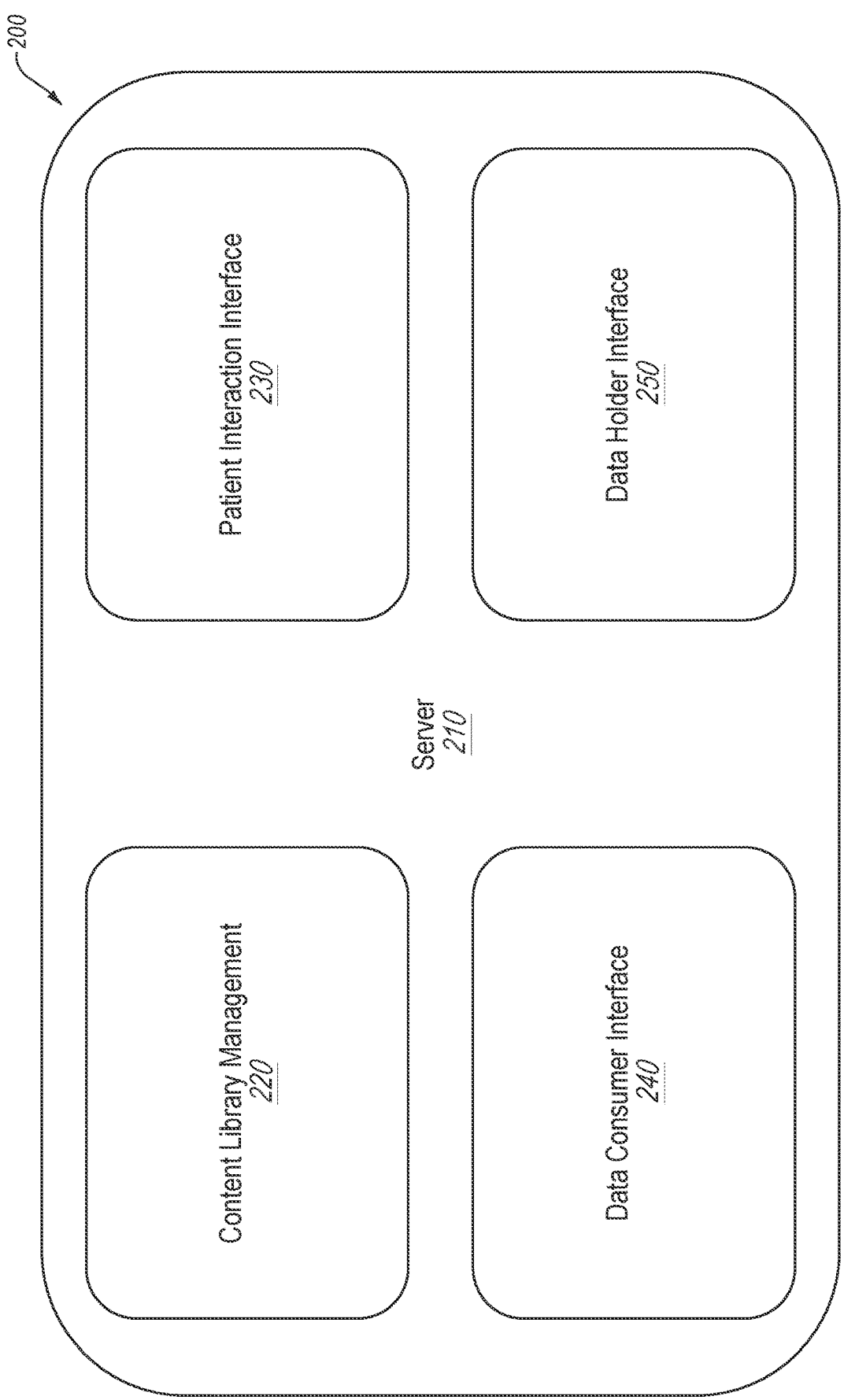
FIG. 2 illustrates an example diagram of a consent server.

FIG. 2 illustrates an example diagram 200 of a consent server 210, in accordance with one or more embodiments of the present disclosure. The consent server 210 may include a content library management component 220, a patient interaction interface 230, a data consumer interface 240, and/or a data holder interface 250. The consent server 210 may be comparable or similar to the content server 110 of FIG. 1.

The content library management component 220 may include any combination of devices, system, storage devices, communication devices, computing devices, sub-components thereof, and/or combinations thereof. The content library management component 220 may be configured to store and manage various electronic content. For example, the content library management component 220 may be configured to store forms which the user has electronically signed, fillable forms or documents, spreadsheets or other formats of the consents and/or permissions granted by the user, educational videos, questionnaires to be presented to the user, fillable-form questionnaires to be customized and presented to the user, among others.

The patient interaction interface 230 may include any combination of devices, system, storage devices, communication devices, computing devices, sub-components thereof, and/or combinations thereof. The patient interaction interface 230 may be configured to present and/or communicate various user interfaces with a user. For example, the patient interaction interface 230 may be configured to present one or more user interfaces displaying queries via which the user may identify their preferences, permissions, and/or consent that may be selected. As another example, the user may be able to log in and manager their user profile, update their permissions and/or consents granted, see various data sharing inquiries, among others.

The data consumer interface 240 may include any combination of devices, system, storage devices, communication devices, computing devices, sub-components thereof, and/or combinations thereof. The data consumer interface 240 may be configured to operate as an interface via which a third party may interact with the consent server 210. For example, the data consumer interface 240 may include a portal via which the data consumer may request access to personal data of one or more users, submit compensation for the access, or perform other similar or related actions. In some embodiments, the data consumer interface 250 may facilitate a secure, encrypted, or otherwise protected communication modality.

The data holder interface 250 may include any combination of devices, system, storage devices, communication devices, computing devices, sub-components thereof, and/or combinations thereof. The data holder interface 250 may be configured to operate as an interface via which a data holder may interact with the consent server 210. For example, the data holder may be informed of the consents granted by the user and/or updates thereto via the data holder interface 250. As another example, the consent server 210 may submit a request for data from the data holder, or receive data from the data holder over the data holder interface 250. In some embodiments, the data holder interface 250 may facilitate a secure, encrypted, or otherwise protected communication modality.

Modifications, additions, or omissions may be made to FIG. 2 without departing from the scope of the present disclosure. For example, the diagram 200 may include more or fewer elements than those illustrated and described in the present disclosure.

Figure 3:
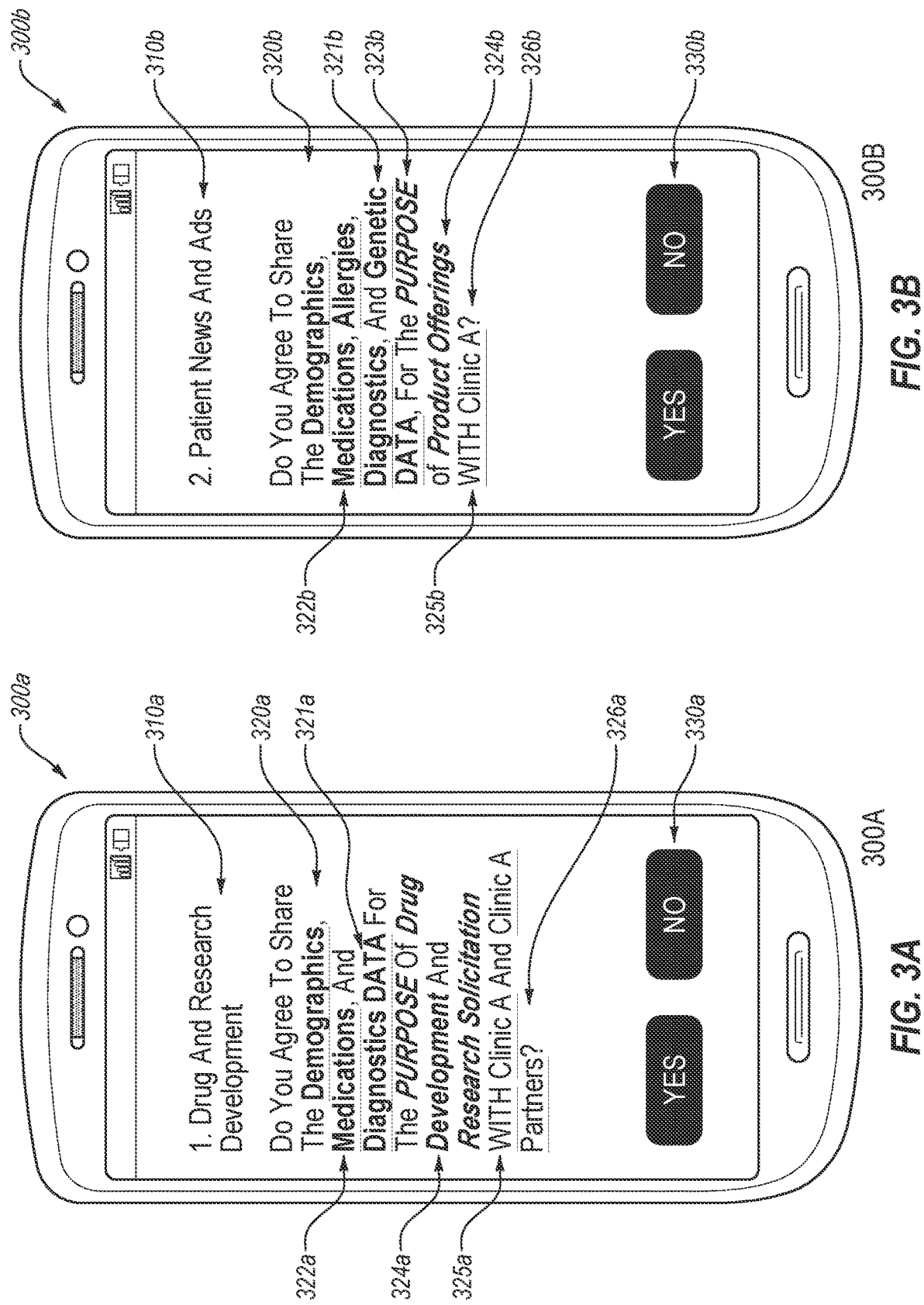
FIGS. 3A and 3B are example user interfaces for obtaining permissions from a user.

FIGS. 3A and 3B are example user interfaces 300a and 300b for obtaining permissions from a user, in accordance with one or more embodiments of the present disclosure.

As illustrated in FIG. 3A, the user interface 300a may include a category 310a that may provide a heading that generally explains the purpose for which consent or permission is sought from the user, an inquiry 320a for soliciting information from the user, and input buttons 330a via which the user may make their selection.

The category 310a may include any group of topics related to one or more given purposes. For example, as illustrated in FIG. 3A, the category 310a indicates the inquiry is related to the purposes of drug and research development. The category 310a may include a high level description of the related topics to alert the user to the type of question expected in the inquiry 320a.

The inquiry 320a may include a specific question to which an answer is expected from the user. The inquiry 320a may include an indication of a DATA portion 321a, a PURPOSE portion 323a, and an ENTITY portion 325a. The DATA portions 321a may identify one or more types of data 322a that are being inquired about (such as "Demographics," "Medications," and "Diagnostics" as illustrated in FIG. 3A). The PURPOSE portion 323a may identify one or more purposes 324a for which the data may be used (such as for "drug development" and "research solicitation" as illustrated in FIG. 3A). The ENTITY portion 325a may include one or more entities 326a permitted to access the data (such as "Clinic A" and "Clinic A Partners" as illustrated in FIG. 3A).

The input buttons 330a may be used by the user to readily indicate in a binary manner whether or not they agree to granting access to their personal data in the manner reflected in the inquiry 320a. Using such an input option may allow the user to avoid having to type in specific responses or be asked a lengthy series of questions.

As illustrated in FIG. 3B, the user interface 300b may include a category 310b that may provide a heading that generally explains the purpose for which consent or permission is sought from the user, an inquiry 320b for soliciting information from the user, and input buttons 330b via which the user may make their selection.

The category 310b may include any group of topics related to one or more given purposes. For example, as illustrated in FIG. 3B, the category 310b indicates the inquiry is related to the purposes of patient news and advertisements. The category 310b may include a high level description of the related topics to alert the user to the type of question expected in the inquiry 320b.

The inquiry 320b may include a specific question to which an answer is expected from the user. The inquiry 320b may include an indication of a DATA portion 321b, a PURPOSE portion 323b, and an ENTITY portion 325b. The DATA portions 321b may identify one or more types of data 322b that are being inquired about (such as "Demographics," "Medications," "Allergies," "Genomics," and "Diagnostics" as illustrated in FIG. 3B). The PURPOSE portion 323b may identify one or more purposes 324b for which the data may be used (such as for "product offerings" as illustrated in FIG. 3B). The ENTITY portion 325b may include one or more entities 326b permitted to access the data (such as "Clinic A" as illustrated in FIG. 3B).

In some embodiments, the inquiries 320a and/or 320b may be a fillable or automatically created question that populates one or more of the DATA portions 321a/321b, the PURPOSE portion 323a/323b, and/or the ENTITY portion 325a/325b with information to collect permissions on consent for various combinations thereof. In some embodiments, the inquiries 320a and/or 320b may be multi-modal inquiries such that multiple entries in Tables 1, 2, and 3 may be filled by answering a single question. In these and other embodiments, a combination of a series of multi-modal questions may be used to partially, mostly, or fully fill a series of entries for a given user, such as by fully filling the Tables 1, 2, and 3. In some embodiments, a series of inquiries 320a/320b may be generated and asked of the user until consent preferences are obtained for each of the entries in the Tables 1, 2, and 3.

While examples are provided in FIGS. 3A/3B of various dimensions of data for consideration, including what data, the purpose for access, and the entity seeking access, it will be appreciated that any other factors may also be tracked and/or considered in conjunction with granting access to the data, such as temporal factors, compensation factors, among others.

Modifications, additions, or omissions may be made to FIGS. 3A/3B without departing from the scope of the present disclosure. For example, the user interfaces 300a/300b may include more or fewer elements than those illustrated and described in the present disclosure. Additionally or alternatively, any visual form may be taken for the user interfaces 300a/300b. For example, multiple inquiries with their own respective input For each of FIGS. 4-9, the associated operations may be performed by any suitable system or device. For example, one or more operations of the operations depicted in FIGS. 4-9 may be performed by or directed for performance by the system 100, the consent server 110, or other components of FIG. 1 and/or the consent server 200 of FIG. 2. Additionally or alternatively, the operations may be performed by a computing system such as the computing system 1000 of FIG. 10.

Modifications, additions, or omissions may be made to FIGS. 4-9 without departing from the scope of the present disclosure. For example, the operations depicted in FIGS. 4-9 may include more or fewer operations than those illustrated and described in the present disclosure. Further, the order of the description of operations depicted in FIGS. 4-9 does not mean that the operations must be performed in the described order. In addition, in some instances, a same operation may be described with respect to different portions of the operations depicted in FIGS. 4-9, but in some instances may only be performed once and used for the different portions of the operations depicted in FIGS. 4-9.

Figure 4:
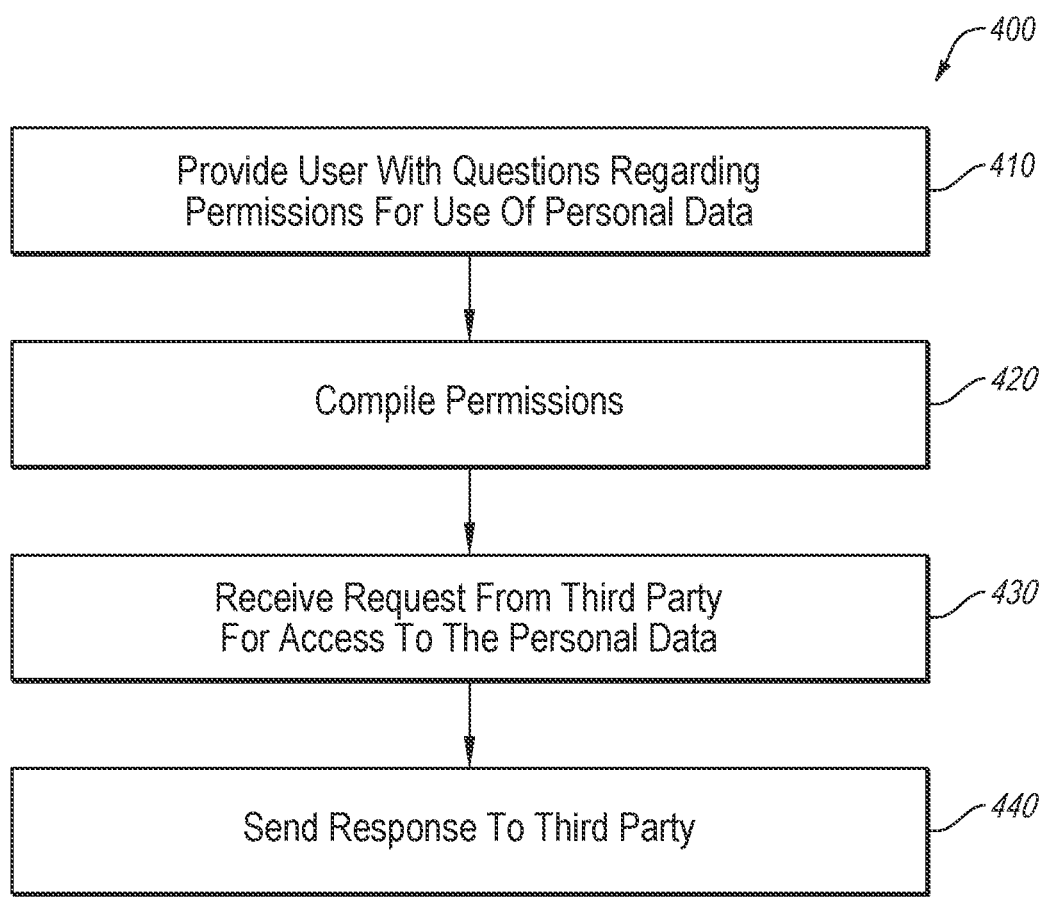
FIG. 4 is a flowchart of an example method of monitoring permissions.

FIG. 4 is a flowchart of an example method 400 of monitoring permissions, in accordance with one or more embodiments of the present disclosure.

At block 410, a user may be provided with one or more questions regarding permissions for use of personal data. For example, a user may be presented with a user interface (such as those illustrated in FIGS. 3A/3B) with one or more inquiries to which the user may respond. The inquiries may be multi-modal such that permissions regarding consent for data sharing across multiple entities, purposes, and/or types of data may be determined using a single inquiry.

At block 420, the permissions indicated by the answers of the user to the questions of the block 410 may be compiled. For example, one or more entries like the Tables 1, 2, and/or 3 may be prepared based on the answers given by the user. In these and other embodiments, the block 410 may be repeated until the compilation of permissions may indicate the user's preferences across multiple data types for multiple purposes for one or more entities.

At block 430, a request may be received from a third party for access to the personal data of the user. Such a request may be a request specifically for one or more types of data associated with that specific user (such as a laboratory seeking allergy information for a user). Additionally or alternatively, the request may be a generic request for a group within which the user falls. For example, the request may include a cohort of individuals (e.g., males over fifty years old) and seek the data for a given purpose, and the user may fall within the cohort and may or may not have granted access for the given purpose for the third party.

At block 440, a response may be sent to the third party indicating whether or not the third party is permitted to access the personal data of the user. For example, the response may include a simple binary communication of whether or not the third party is permitted access to the data. As another example, the response may include facilitating the third party gaining access to the personal data when held by a data holder. As an additional example, the response may include a link or other identifier to where the third party may access the data or where the third party may request the data from the data holder. As a further example, the response may include a verified and/or authenticated permission such as a signed digital certificate which the third party may present to the data holder to verify the authorization of access to the personal data.

Figure 5:
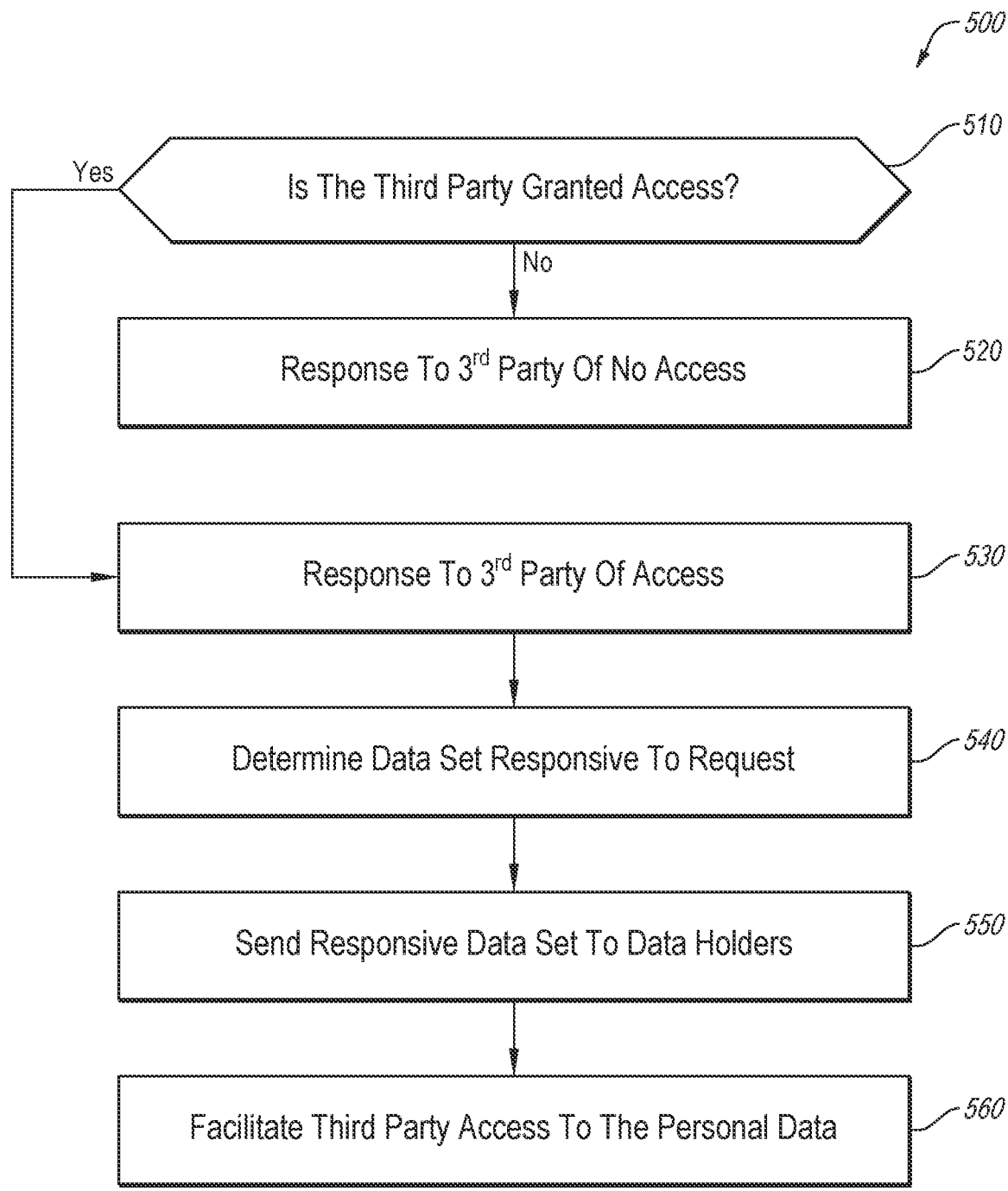
FIG. 5 is a flowchart of an example method of monitoring permissions to facilitate data access.

FIG. 5 is a flowchart of an example method 500 of monitoring permissions to facilitate data access, in accordance with one or more embodiments of the present disclosure.

At block 510, a determination may be made whether a third party is granted access to the personal data of a user. In some embodiments, such an inquiry may be a general inquiry into a cohort of user data of which the user is a part, or it may be an inquiry into the user specifically. In some embodiments, such a determination may be performed by comparing a matrix, database, table, spreadsheet, or other storage of the consents or permissions granted by the user for various entities and for various purposes (such as those illustrated in Tables 1, 2, and 3), and the third party being checked accordingly to verify that it is an entity and using the personal data for a purpose for which the user has indicated consent. Based on the determination indicating that the third party is not granted access, the method 500 may proceed to the block 520. Based on the determination indicating that the third party is granted access, the method 500 may proceed to the block 530.

In some embodiments, the block 510 may be performed based on an inquiry from the third party, may be performed periodically, or may be performed based on a triggering event such as the user adjusting their permissions or consents.

At block 520, a response may be provided to the third party that the third party does not have access to the personal data of the user. For example, if the user has updated their permissions the third party may be notified that they no longer have access to the personal data of the user. As another example, the response may be provided responsive to an inquiry from the third party.

At block 530, a response may be provided to the third party that the third party does have access to the personal data of the user. For example, the response may include an indication that the third party is permitted access. As another example, the response may include a notification of where the data may be accessed, an encrypted form of the data, or any other response by which the third party may be informed they have access to the personal data of the user.

At block 540, a determination may be made of a data set that is responsive to an inquiry from the third party. For example, the third party may indicate that they are seeking personal data for a cohort of patients that meet a certain demographic, disease profile, and/or other characteristics and are seeking the data for a specified purpose. The determination may identify one or more users who meet the demographic, disease profile, and/or other characteristics as identified by the third party; who have granted access to entities of the type of which the third party is associated; and who have granted access to their data for the purpose specified by the third party.

At block 550, the responsive data set determined at the block 540 may be provided to a data holder. For example, a list of users and/or associated identifiers may be provided to the data holder. In some embodiments, the responsive data set may include an authorization by a consent server for the third party to access the personal data of the users in the responsive data set. Additionally or alternatively, the responsive data set may include instructions for the manner in which the third party is to access the personal data. For example, the instructions may indicate an address of the third party such that the data holder may provide the data directly to the third party. As another example, the instructions may indicate that an access uniform resource locator (URL) or other identifier is to be provided via which the third party may access the data. As a further example, the instructions may indicate that an encrypted version of the data is to be provided to the consent server. Continuing such an example, the instructions may indicate that the key for decrypting the encrypted data may be provided to the consent server or may be provided directly to the third party such that the consent server never holds the encrypted data and a key to decrypt the encrypted data.

At block 560, the consent server may facilitate access to the personal data by the third party. In some embodiments, facilitating access may be performed in a manner consistent with the instructions sent to the data holder as described at the block 550. Various examples of providing access to the personal data are described throughout the disclosure, such as FIGS. 6-8. In addition to the examples provided in FIGS. 6-8, there are many other ways and manners in which the consent server may facilitate access to the personal data that is consistent with the present disclosure.

Figure 6:
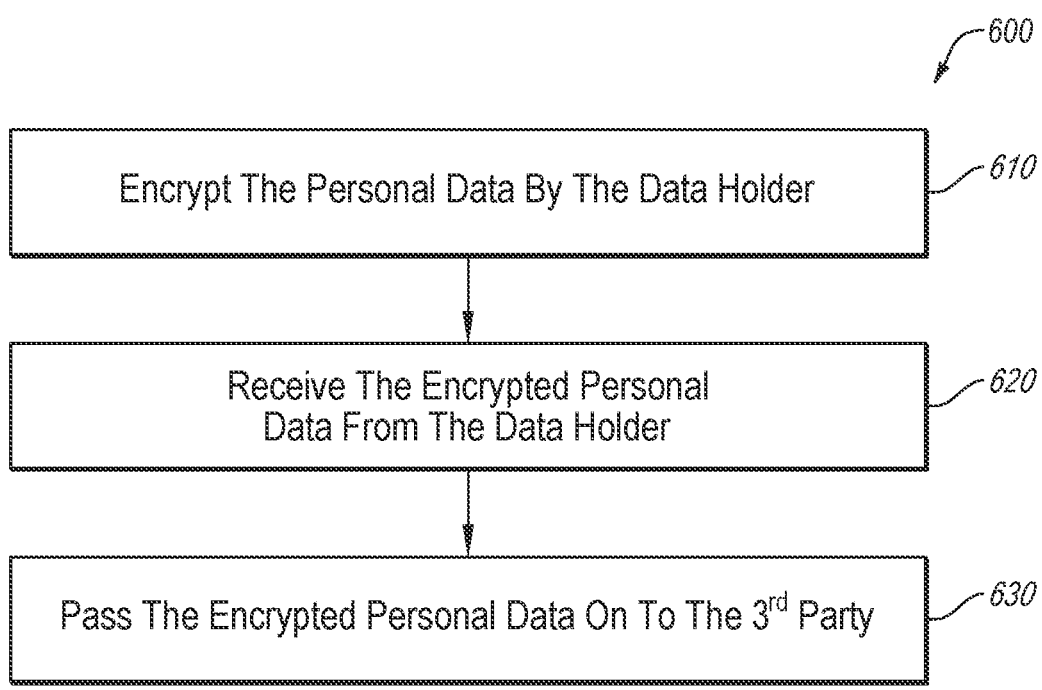
FIG. 6 is a flowchart of an example method of facilitating data access.
Figure 7:
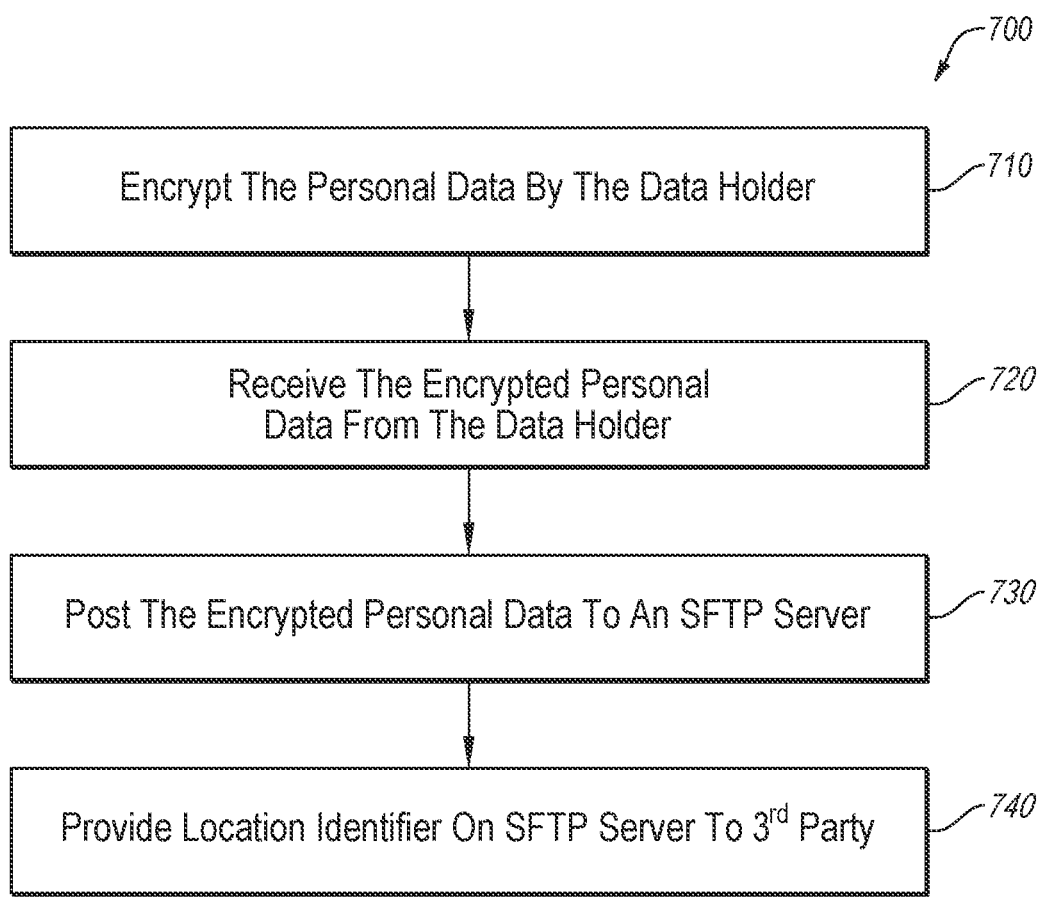
FIG. 7 is a flowchart of another example method of facilitating data access.
Figure 8:
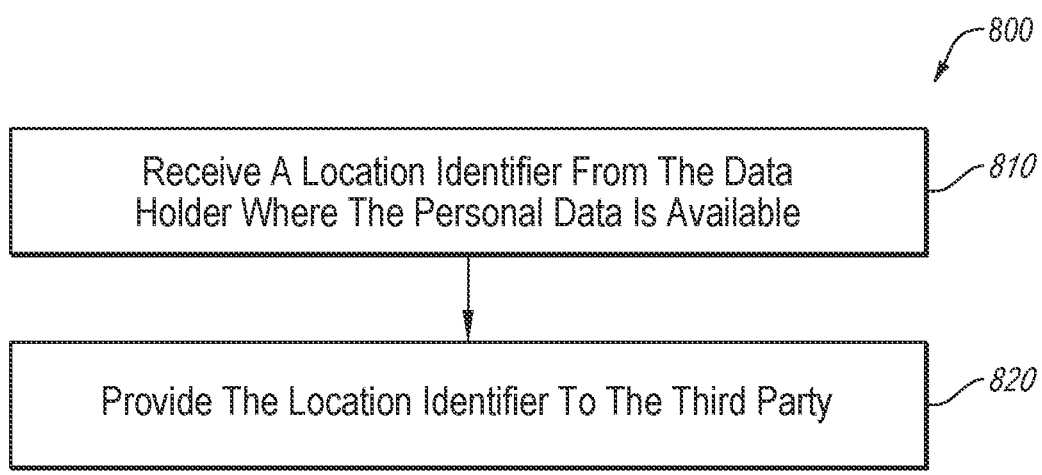
FIG. 8 is a flowchart of an additional example method of facilitating data access.

FIGS. 6-8 may be continuations of FIG. 5, or specific implementations of FIG. 5, such as the block 560 of FIG. 5.

FIG. 6 is a flowchart of an example method 600 of facilitating data access, in accordance with one or more embodiments of the present disclosure.

At block 610, the personal data of the user may be encrypted by the data holder. For example, the data holder may encrypt the data using an appropriate encryption mechanism such as in a format compatible with various aspects of exchanging health data, such as to facilitate exchange using an FHIR format. In some embodiments, the encryption may include public/private key encryption, symmetric encryption, asymmetric encryption, or any other encryption technique.

At block 620, the encrypted personal data may be received from the data holder. For example, the consent server may receive the encrypted form of the personal data from the data holder. Such data may include data for multiple users including the user.

At block 630, the encrypted data may be passed to the third party. For example, the encrypted data may be streamed from the data holder and passed through and streamed on to the third party. In such a circumstance, the consent server may act as a pass through device such that the consent server does not store the encrypted data, but acts as a pass through. In such a circumstance, the data holder may be able to trust the consent server and pass the encrypted data to the consent server, and the consent server may pass the data on to the third party based on the consent server verifying that the third party is permitted access to the data. In this way, the third party is able to access the data without the data holder having to trust or verify that the third party is authorized to access the personal data.

FIG. 7 is a flowchart of another example method 700 of facilitating data access, in accordance with one or more embodiments of the present disclosure.

At block 710, the personal data may be encrypted by the data holder. The block 710 may be similar or comparable to the block 610.

At block 720, the consent server may receive the encrypted personal data from the data holder. The block 720 may be similar or comparable to the block 620.

At block 730, the encrypted personal data may be posted to a secure shell file transfer protocol (SFTP) server. For example, the encrypted data may be saved to a server with an outward facing interface via which other entities (such as the third party) may access the encrypted data. While an SFTP server is used as an example, it will be appreciated that any other type of remotely accessible data storage may be used.

At block 740, the location identifier of the encrypted personal data may be provided to the third party. For example, a URL or other identifier of the location of the encrypted personal data may be provided to the third party. In some embodiments, the SFTP server may be password protected or otherwise configured to prevent general access to the data stored thereon without some authentication, certification, or verification of the third party.

FIG. 8 is a flowchart of an additional example method 800 of facilitating data access, in accordance with one or more embodiments of the present disclosure.

At block 810, a location identifier of where the personal data is accessible may be received from the data holder. For example, the data holder may send a URL or other location identifier to the consent server. In some circumstances, the data holder may encrypt the data and/or post it to an SFTP or other secure server.

At block 820, the location identifier may be provided to the third party. For example, the data holder may provide the location identifier to the consent server at the block 810 and the consent server may provide the identifier to the third party at the block 820. In some embodiments, the consent server may include credentials such as a user name, password, multi-factor authentication details, or other information to facilitate the third party accessing the data from the location identified by the data holder.

Figure 9:
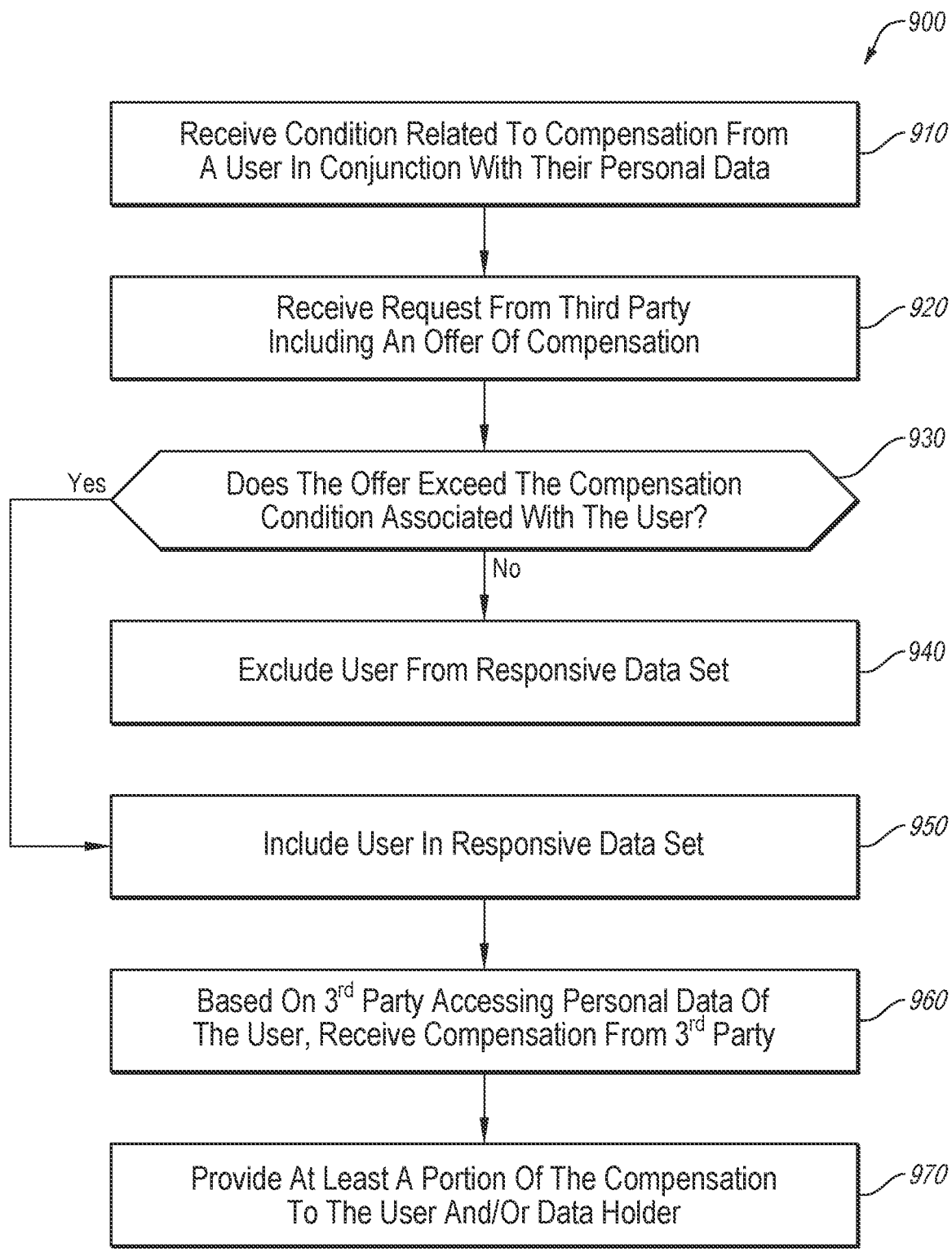
FIG. 9 is a flowchart of an example method of monitoring permissions to facilitate data access based on compensation.

FIG. 9 is a flowchart of an example method 900 of monitoring permissions to facilitate data access based on compensation, in accordance with one or more embodiments of the present disclosure.

At block 910, a condition related to compensation from a user in conjunction with their personal data may be received. For example, a user may designate a threshold amount of compensation beyond which they are willing to grant access to their personal data. In some embodiments, multiple conditions may be included. For example, a first threshold amount may be included for drug research and a second higher threshold amount may be included for product offerings.

In some embodiments, other conditions may be included that are not associated with compensation. For example, such a condition may include a triggering event such as the death of the user. In some embodiments, other conditions may include passage of a certain amount of time, such as an age for the user or four years gone from a disease diagnosis, or other passage of time.

At block 920, a request may be received from a third party for access to personal data where the request includes an offer of compensation for accessing the personal data. For example, the third party may contact the consent server requesting personal data for users consistent with a set of parameters, and may offer to pay some amount of money for being granted access to the data. Additionally or alternatively, the offer and/or compensation may include any other type of compensation, such as free or discounted medication to the patient and/or their relatives, free or discounted health insurance, free or discounted medical care, tangible goods, or any other type of compensation.

At block 930, a determination may be made whether the offer for compensation includes a portion being attributed to or passable on to the user for accessing their personal data exceeds the threshold identified in the block 910 for the user. If it is determined that the amount that the user will receive does not exceed the threshold set by the user, the method 900 may proceed to the block 940. If it is determined that the amount that the user will receive exceeds the threshold set by the user, the method 900 may proceed to the block 950.

At block 940, based on the amount being below the threshold, the user may be excluded from a responsive data set. Stated another way, because the user would not receive sufficient compensation for allowing access to their data, the personal data of the user will not be included in the set accessible by the third party.

At block 950, based on the amount being above the threshold, the user may be included in a responsive data set. For example, the set of users sent to a data holder (such as the block 550 of FIG. 5) may include the user such that their personal data is identified as data to which the third party is granted access.

At block 960, based on the third party accessing the personal data of the user, compensation may be received from the third party. For example, after accessing the personal data of the user, the third party may provide compensation to the consent server for granting access to the personal data. Additionally or alternatively, the third party may provide the compensation as a precondition to being permitted access to the personal data.

At block 970, at least a portion of the compensation received may be provided to the user. For example, a portion of the compensation may be provided to the data holder, a portion may be provided to the user, and/or a portion may be retained by the consent server.

Figure 10:
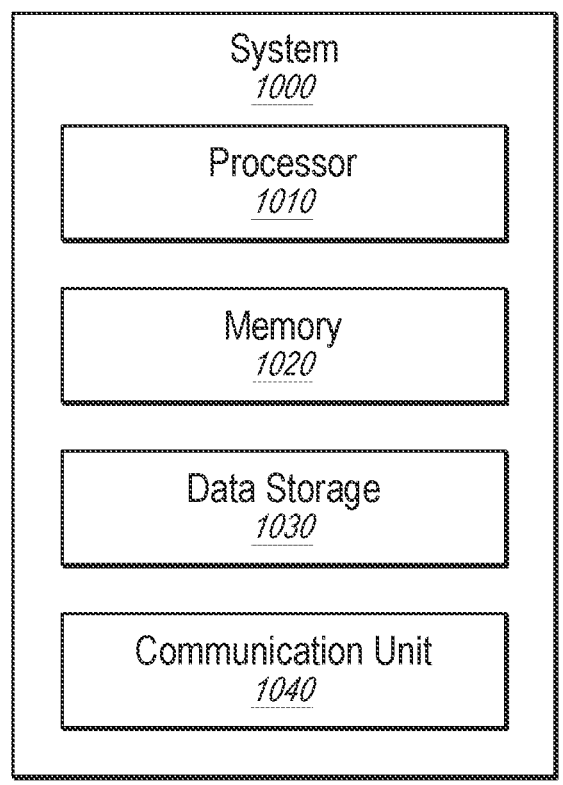
FIG. 10 illustrates a block diagram of an example computing system.

FIG. 10 illustrates a block diagram of an example computing system 1000, according to at least one embodiment of the present disclosure. The computing system 1000 may be configured to implement or direct one or more operations associated with monitoring consent and/or facilitating data exchange (e.g., the system 100 and/or the consent server of FIGS. 1 and/or 2). The computing system 1000 may include a processor 1010, a memory 1020, and a data storage 1030. The processor 1010, the memory 1020, and the data storage 1030 may be communicatively coupled.

In general, the processor 1010 may include any suitable special-purpose or general-purpose computer, computing entity, or processing device including various computer hardware or software modules and may be configured to execute instructions stored on any applicable computer-readable storage media. For example, the processor 1010 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 10, the processor 1010 may include any number of processors configured to, individually or collectively, perform or direct performance of any number of operations described in the present disclosure. Additionally, one or more of the processors may be present on one or more different electronic devices, such as different servers.

In some embodiments, the processor 1010 may be configured to interpret and/or execute program instructions and/or process data stored in the memory 1020, the data storage 1030, or the memory 1020 and the data storage 1030. In some embodiments, the processor 1010 may fetch program instructions from the data storage 1030 and load the program instructions in the memory 1020. After the program instructions are loaded into memory 1020, the processor 1010 may execute the program instructions. For example, the processor 1010 may cause the computing system 1000 to perform one or more of the operations associated with monitoring and/or compiling permissions from a user. As another example, the processor 1010 may cause the computing system 1000 to perform one or more of the operations associated with facilitating a data exchange based on the permissions.

The memory 1020 and the data storage 1030 may include computer-readable storage media for carrying or having computer-executable instructions or data structures stored thereon. Such computer-readable storage media may include any available media that may be accessed by a general-purpose or special-purpose computer, such as the processor 1010. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1010 to perform a certain operation or group of operations.

Modifications, additions, or omissions may be made to the computing system 1000 without departing from the scope of the present disclosure. For example, in some embodiments, the computing system 1000 may include any number of other components that may not be explicitly illustrated or described.

As indicated above, the embodiments described in the present disclosure may include the use of a special purpose or general purpose computer including various computer hardware or software modules, as discussed in greater detail below. Further, as indicated above, embodiments described in the present disclosure may be implemented using computer-readable media for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. This interpretation of the phrase "A or B" is still applicable even though the term "A and/or B" may be used at times to include the possibilities of "A" or "B" or "A and B."

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
providing a user with one or more questions regarding permissions for use of personal data related to the user, the one or more questions providing multiple facets of the permissions regarding the use of the personal data related to the user including at least what entities are permitted access to the personal data, what categories of personal data to which access is permitted, and for what purposes the categories of the personal data can be used;
compiling the multiple facets of permissions for the use of the personal data by a consent server;

storing, by the consent server, the multiple facets of permissions for the use of the personal data during a first communication session at a first point in time;

receiving a request from a third party for access to the personal data during a second communication session at a second point in time later than the first point in time, the request including at least a given entity seeking access to the personal data, one or more given categories of personal data to which access is sought, and one or more given purposes for which the personal data is to be used, the personal data stored by a data holder, the consent server not storing the personal data at the second point in time, the consent server a different entity from the data holder; and providing a response to the third party based on the compiled permissions and the request.

2. The method of claim 1, wherein the multiple facets of permissions further include a type of personal data, and a condition related to having access to the personal data.

3. The method of claim 2, wherein the condition includes at least one of a threshold amount of compensation, a living or dead state of the user, or a temporal condition.

4. The method of claim 1, further comprising:
based on the response indicating that the third party is permitted access to the personal data, sending a responsive dataset from the consent server to the data holder, the responsive dataset responsive to the request from the third party; and
facilitating the third party accessing the personal data.

5. The method of claim 4, wherein facilitating the third party accessing the personal data includes:
receiving an encrypted version of the personal data; and
passing the encrypted version of the personal data to the third party.

6. The method of claim 5, wherein the encrypted version of the personal data is received without ability or information to decrypt the personal data.

7. The method of claim 5, wherein passing the encrypted version of the personal data includes acting as a passthrough between the data holder and the third party such that the personal data is not locally stored when the third party accesses the personal data.

8. The method of claim 5, wherein passing the encrypted version of the personal data includes:
posting the encrypted data to a secure shell file transfer protocol (SFTP) server; and
providing an identifier of the encrypted data on the SFTP to the third party.

9. The method of claim 4, wherein facilitating the third party accessing the personal data includes:
receiving a location identifier of where the personal data is accessible; and
providing the location identifier to the third party.

10. The method of claim 4, wherein facilitating the third party accessing the personal data includes providing an identifier of the third party in the request such that the data holder is able to provide the personal data directly to the third party.

11. The method of claim 4, further comprising sending notification to the user that their data has been accessed by the third party.

12. The method of claim 11, further comprising receiving compensation from the third party for access to the data and providing at least a portion of the compensation to the user, the data holder, or both.

13. The method of claim 1, wherein the request is for a set of users including at least two characteristics including at least one of (i) gender, (ii) age, (iii) disease condition, and (iv) who are willing to permit access to their respective personal data for a target purpose.

14. The method of claim 1, further comprising:
receiving an update from the user regarding the permissions after compiling the permissions; and
based on the update, overriding the compiled permissions.

15. The method of claim 1, further comprising, based on the overridden compiled permissions, sending a communication to a third party previously granted access to the personal data that the previously granted access is revoked.

16. One or more non-transitory computer-readable media containing instructions that, when executed by one or more processors, cause a system to perform operations, the operations comprising:
providing a user with one or more questions regarding permissions for use of personal data related to the user, the one or more questions providing multiple facets of the permissions regarding the use of the personal data related to the user including at least what entities are permitted access to the personal data, what categories of personal data to which access is permitted, and for what purposes the categories of the personal data can be used;
compiling the multiple facets of permissions for the use of the personal data by a consent server;
storing, by the consent server, the multiple facets of permissions for the use of the personal data during a first communication session at a first point in time;
receiving a request from a third party for access to the personal data during a second communication session at a second point in time later than the first point in time, the request including at least a given entity seeking access to the personal data, one or more given categories of personal data to which access is sought, and one or more given purposes for which the personal data is to be used, the personal data stored by a data holder, the consent server not storing the personal data at the second point in time, the consent server a different entity from the data holder; and
providing a response to the third party based on the compiled permissions.

17. The computer-readable media of claim 16, the operations further comprising:
based on the response indicating that the third party is permitted access to the personal data, sending a responsive dataset from the consent server to the data holder, the responsive dataset responsive to the request from the third party; and
facilitating the third party accessing the personal data.

18. The computer-readable media of claim 17, wherein facilitating the third party accessing the personal data includes:
receiving an encrypted version of the personal data; and
passing the encrypted version of the personal data to the third party.

19. The computer-readable media of claim 18, wherein passing the encrypted version of the personal data includes:
posting the encrypted data to a secure shell file transfer protocol (SFTP) server; and
providing an identifier of the encrypted data on the SFTP to the third party.

20. The computer-readable media of claim 18, wherein passing the encrypted version of the personal data includes acting as a passthrough between the data holder and the third party such that the personal data is not locally stored when the third party accesses the personal data.

* * * * *